United States Patent [19]
Higurashi et al.

[11] Patent Number: 6,011,896
[45] Date of Patent: Jan. 4, 2000

[54] METHOD OF RECORDING VARIOUS DIFFERENT VIDEO SIGNALS ONTO MAGNETIC TAPE

[75] Inventors: Seiji Higurashi, Fuchu; Takeo Ohishi; Mitsuo Harumatsu, both of Kanagawa-ken, all of Japan

[73] Assignee: Victor Company of Japan, Ltd., Yokohama, Japan

[21] Appl. No.: 09/317,825

[22] Filed: May 25, 1999

Related U.S. Application Data

[63] Continuation of application No. 08/959,108, Oct. 23, 1997, abandoned, which is a continuation of application No. 08/595,828, Feb. 2, 1996, abandoned.

[30] Foreign Application Priority Data

Feb. 13, 1995  [JP]  Japan ................................ 7-47860

[51] Int. Cl.$^7$ .............. H04N 5/91; H04N 5/92; H04N 5/76; H04N 7/08
[52] U.S. Cl. .................. 386/92; 386/108; 360/18
[58] Field of Search .................. 386/35, 40, 92, 386/108, 124; 360/18, 20; H04N 5/76, 5/92

[56] References Cited

U.S. PATENT DOCUMENTS

| | | | |
|---|---|---|---|
| 4,463,387 | 7/1984 | Hashimoto et al. | 358/310 |
| 4,477,844 | 10/1984 | Nakano et al. | 350/8 |
| 5,065,259 | 11/1991 | Kubota et al. | 360/32 |
| 5,239,381 | 8/1993 | Takahashi | 358/335 |
| 5,317,413 | 5/1994 | Yanagihara | 358/335 |
| 5,355,229 | 10/1994 | Arano et al. | 358/343 |
| 5,377,051 | 12/1994 | Lane et al. | 360/33.1 |
| 5,459,621 | 10/1995 | Tsuji et al. | 360/32 |

FOREIGN PATENT DOCUMENTS

| | | |
|---|---|---|
| 0437316 | 7/1991 | European Pat. Off. . |
| 0488373 | 6/1992 | European Pat. Off. . |
| 0542576A1 | 11/1992 | European Pat. Off. . |
| 054 | 5/1993 | European Pat. Off. . |
| 0644692 | 3/1995 | European Pat. Off. . |

OTHER PUBLICATIONS

"Digital Audio/Video Standards" Guidebook, 1994.

*Primary Examiner*—Douglas W. Olms
*Assistant Examiner*—David R Vincent
*Attorney, Agent, or Firm*—Louis Woo

[57] ABSTRACT

A method of recording video data and the accompanied sound data capable of editing the video data and sound data track by track without editing gaps is disclosed. The track format includes a first block of tracks for video data and a second block of tracks for sound data for a predetermined number of frames. Another method of selectively recording one of a plurality of kinds of video data having different amounts of data per frame or field and the accompanied sound data (NTSC and PAL for example) is provided. In this method, the video data and sound data are recorded with a recording and editing unit which is a determined by a common multiple of the selected one of kinds of video data among the amounts of data of the different kinds of video data. In NTSC method the video and sound data are receded every six frames or fields and in the PAL method, the video and sound data are recorded every 5 frames or fields, so that a track pattern having T=24 tracks including P tracks for sound data and T–P tracks for video data are recurrently recorded. The video and sound data are recorded track by track, so that video and sound data can be edited tack by track.

12 Claims, 8 Drawing Sheets

□ VIDEO TRACK
▧ SOUND TRACK

METHOD OF RECORDING VARIOUS DIFFERENT VIDEO SIGNALS ONTO MAGNETIC TAPE

CROSS-REFERENCES TO RELATED APPLICATIONS

This is a continuation of U.S. patent application, Ser. No. 08/959,108, filed on Oct. 23, 1997, now abandoned which is a continuation of U.S. patent application, Ser. No. 08/595,828, filed on Feb. 2, 1996, now abandoned.

BACKGROUND OF THE INVENTION

1. Field of the Invention

This invention relates to a method of recording data, and particularly to a method of recording video data and accompanied sound data on a magnetic tape through a helical scanning.

2. Description of the Prior Art

A method of recording video data and accompanied sound data on a magnetic tape through a helical scanning is known. In such a method, each of helical scanned tracks includes a first recording area for the video data and a second recording area for the sound data, wherein the second recording area is extremely narrower than the first recording area because an amount of the video data is larger than that of the sound data. Particularly, in the case of recording an extremely fine image signal, such as HDTV (high-definition television) signal, the recording area of the sound signal is extremely narrower than that of the video signal. Such a sound signal is recorded at substantially the same position of respective tracks and the recording areas of the sound signal on consecutive tracks are arranged with a small width on the magnetic tape in the feeding direction of the magnetic tape.

Moreover, in the track pattern of the digital VTR mentioned above, a number of editing gaps (for example, IBG (Inter Block Gap), Preamble, Post amble, or the like) for rewriting of the video signal or the sound signal for editing are provided on each track.

Figure 7:
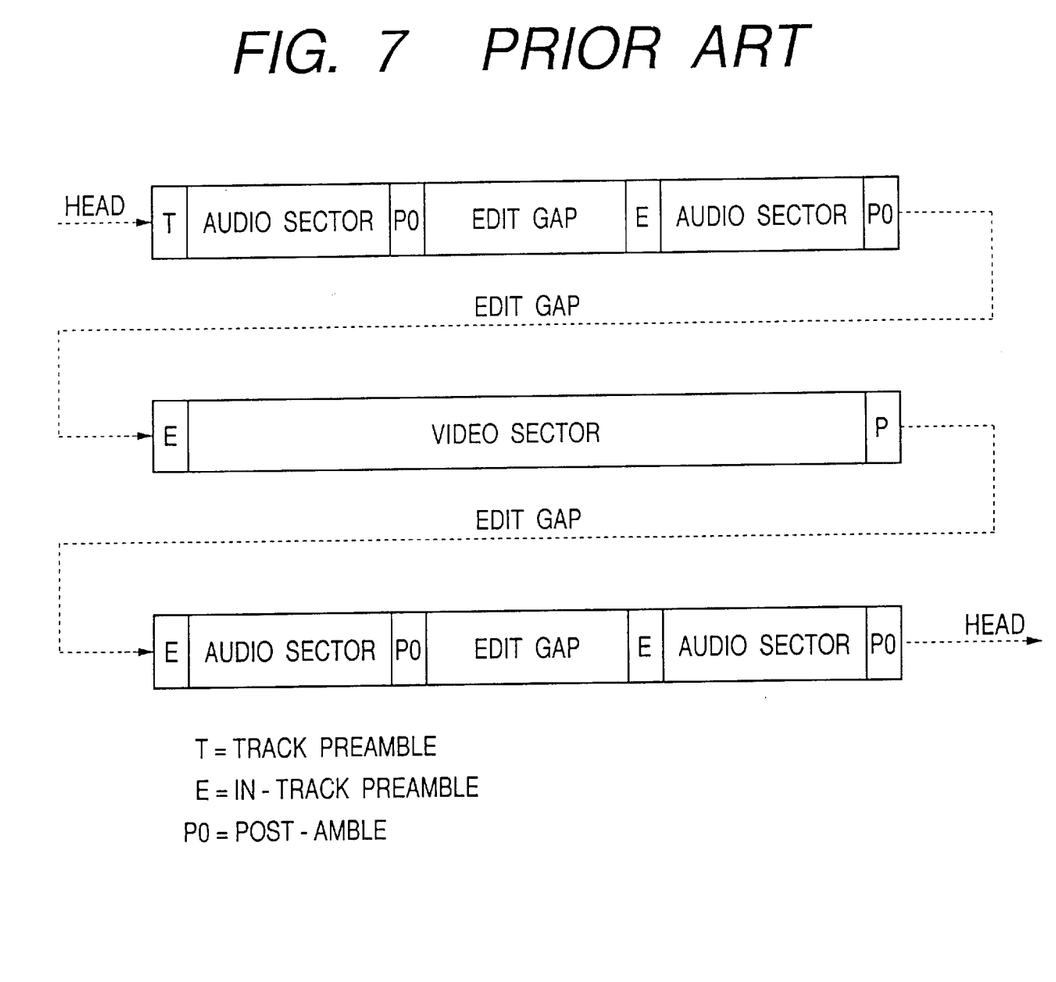
FIG. 7 is an illustration of a prior art track format according to D2 format (NTSC).

FIG. 7 is an illustration of a prior art track format according to D2 format (NTSC). In this track format, the sound data is recorded upper and lower portion of respective tracks and there are edit gaps are provided for editing to reduce an affection of a timing error. These editing gap decreases the efficiency of utilizing the magnetic tape.

Further, the sound signal is recorded with every track-channel exchanged, so that there is an affection to other tracks such as unerasing or excessive erasing and the control is also complicated. Moreover, because the recording areas of the sound signal on respective tracks are mainly arranged in the feeding direction of the magnetic tape, there is a tendency that a burst error occurs due to a scratch in the longitudinal (horizontal) direction of the magnetic tape.

SUMMARY OF THE INVENTION

The aim of the present invention is to provide an improved method of recording a signal.

According to the present invention there is provided a method of selectively recording one of a plurality of kinds of video signals having different amounts of video data per frame or field and a sound signal accompanied one of a plurality of kinds of video signals on a magnetic tape using a helical scanning head unit, which comprises the steps of: sectioning one of a plurality of kinds of video signals and the sound signal every Mk frames or fields, Mk being a natural number more than one and being determined by a common multiple of the amount of the video data of one of the plurality of kinds of video signal per frame or field among the plurality of kinds of video signals; and recording the sectioned one of a plurality of kinds of video signal and the sound signal on the magnetic tape.

According to the present invention there is also provided a method of recording video data and accompanied sound data on a magnetic tape using a helical scanning head unit, which comprises the steps of: sectioning the video data and the accompanied sound data every S frames or fields, S being a natural number more than one and being determined such that an amount of the sound data for the period corresponds to an amount of data recorded on a track formed by the helical scanning on the magnetic tape; and recording the sectioned video data at least at a first block of tracks and recording the sectioned sound data at a second block of at least a track on the magnetic tape.

According to the present invention there is further provided a method of selectively recording one of a plurality of kinds of video signals having different amounts of video data per frame or field and a sound signal accompanied one of a plurality of kinds of video signals on a magnetic tape using a helical scanning head unit, which comprises the steps of: sectioning one of a plurality of kinds of video signals and the signal every Mk frames or fields, Mk being a natural number more than one and being determined by a common multiple of the amount of one of the plurality of kinds of video signal per frame or field among the plurality of kinds of video signals; and recording the sectioned one of a plurality of kinds of video signals and the sectioned sound signal, wherein one of plurality of kinds of video signal and the sound signal are recurrently recorded on the magnetic tape at first block of tracks formed by the head unit and at second block of tracks by the head unit respectively.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
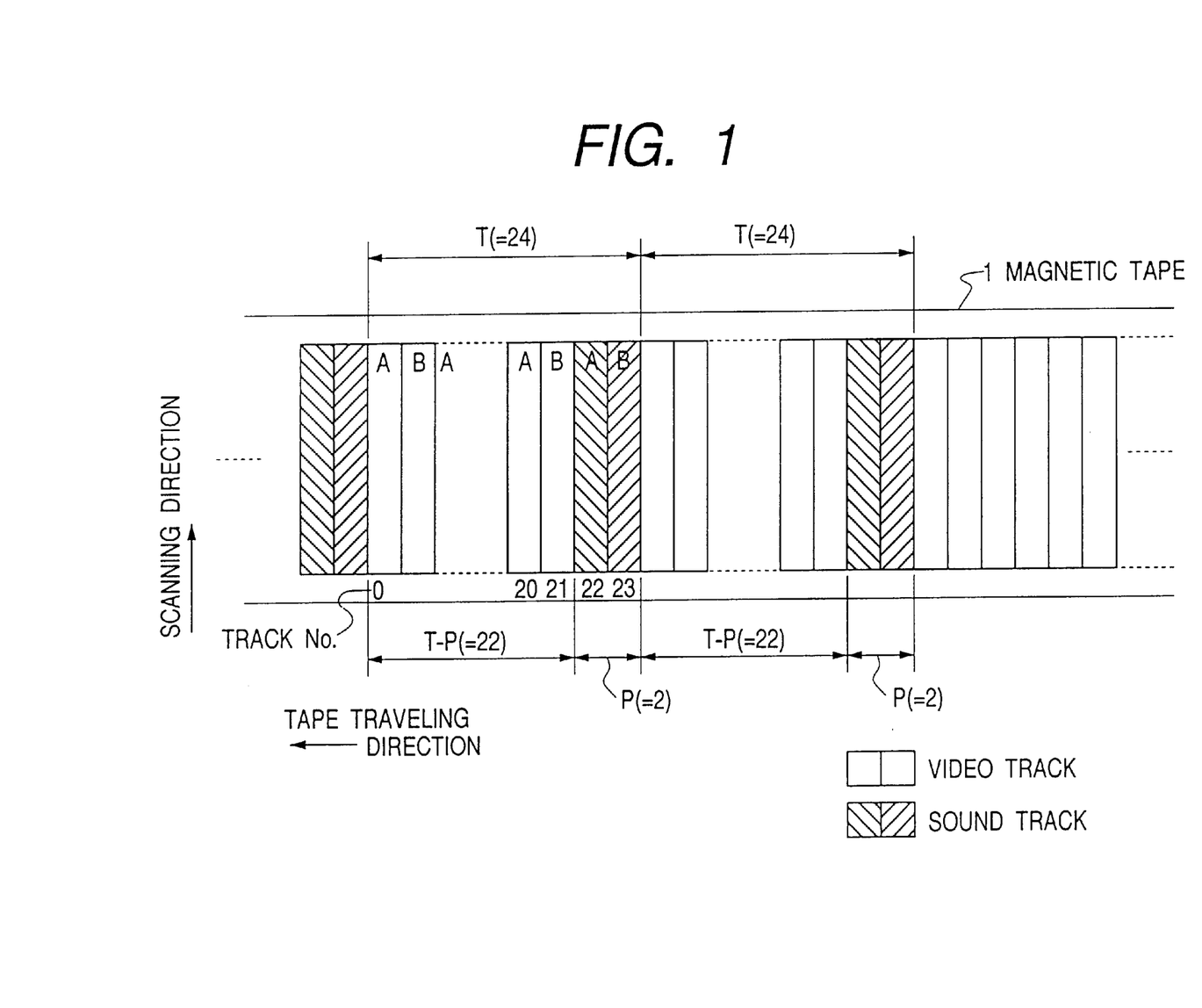
FIG. 1 is an illustration of a track format on a magnetic tape 1 according to a first embodiment of this invention.
Figure 2A:
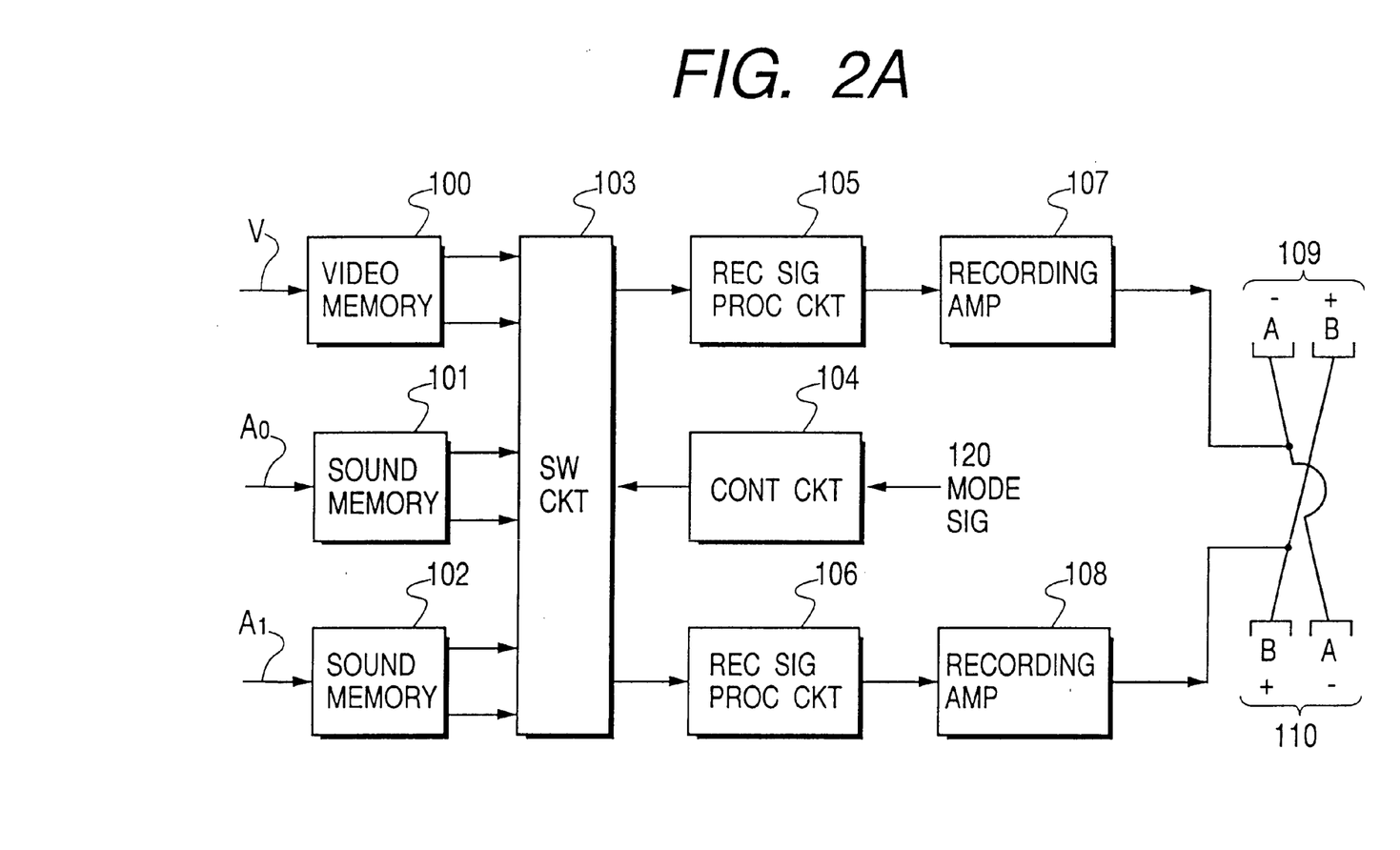
FIG. 2A is a block diagram of a recording portion of a data recording and reproduction apparatus according to this invention.
Figure 2B:
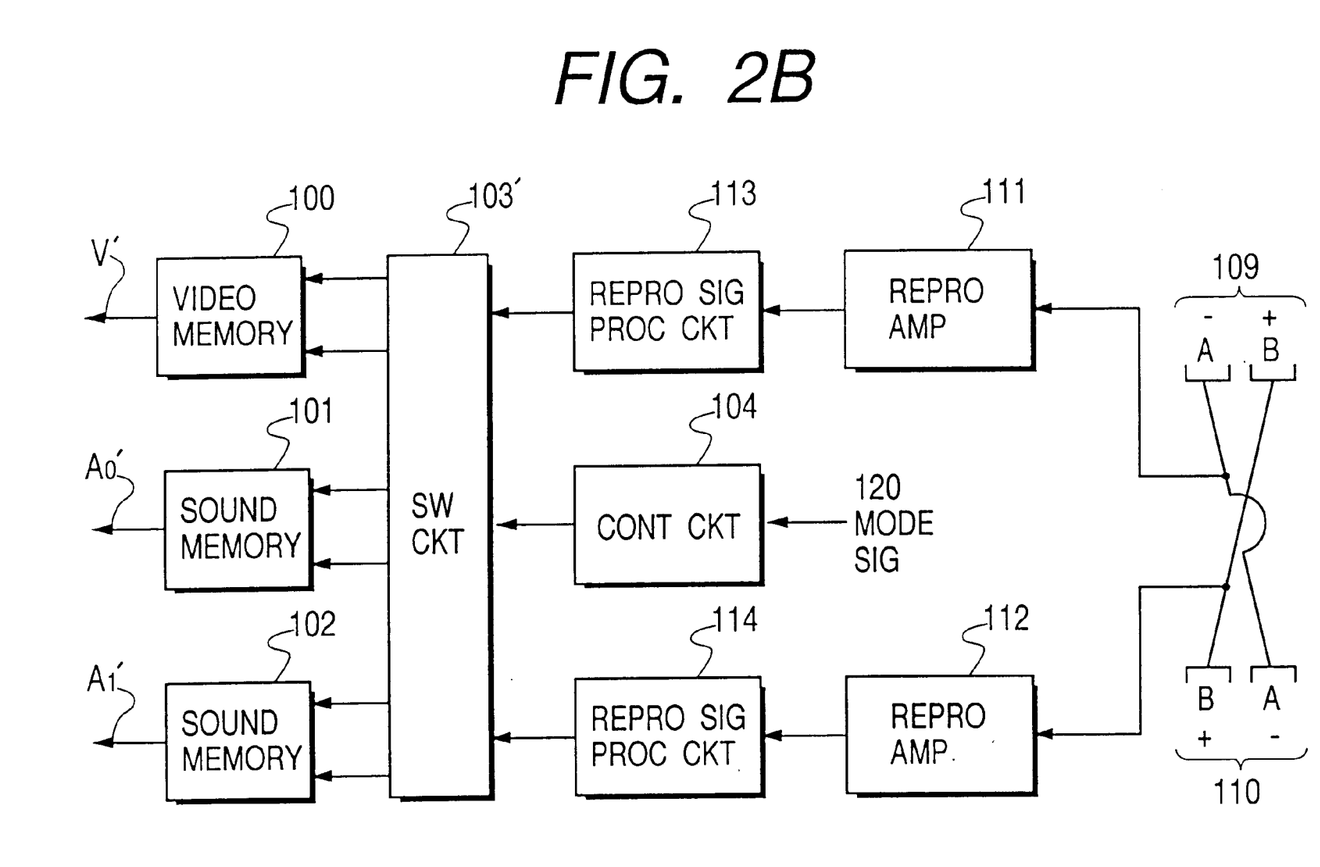
FIG. 2B is a block diagram of a reproduction portion of the data recording and reproduction apparatus according to this invention.

Hereinbelow will be described a first embodiment of this invention. FIG. 1 is an illustration of a track format on a magnetic tape 1 according to this embodiment. FIG. 2A is a block diagram of a recording portion of a data recording and reproduction apparatus according to this invention and FIG. 2B is a block diagram of a reproduction portion of the data recording and reproduction apparatus according to this invention. In the illustrations of track formats, the tape travelling direction of the magnetic tape and the track scanning direction of the rotary magnetic heads perpendicularly intersects each other. However, actually, the tracks are formed slantwise to the tape travelling direction through out the specification.

A method of recording a video signal (video data) and a sound signal (sound data) selectively derived from the video and sound signals of the NTSC method (the NTSC system, the NTSC color video signal) and the video and sound signals of the PAL method (the PAL system, the PAL color video signal) will be described with reference to FIG. 1.

In the NTSC method, the number of scanning line is 525 and the number of fields is 60 (30 frames). In the PAL method, the number of scanning line is 625 and the number of fields is 50 (25 frames).

Firstly, the method of recording the video signal will be described. Generally, if a ratio of amounts of data for one frame period between the NTSC method and the PAL method is determined as 5:6 which is an inverse of a ratio of the numbers of frames between the NTSC and the PAL methods. On the other hand, for example, the resolution of one frame of the NTSC method is defined to be 720 (H)×480 (V) and the resolution of one frame of the PAL method is defined to be 720 (H)×576 (V) wherein the sampling frequencies are the same in both methods.

Then, the amounts of data of one frame are assumed to be 480a and 576a in the NTSC and PAL methods respectively, where "a" is a positive real number.

In both methods, if there is a common number of frames providing the same amount of data, this common number of frames provides a recording and editing unit (editing unit) which is a minimum number of frames for recording and editing for providing a common track pattern.

Then, the number of frames providing the same amount of data is given by:

$$M0=LCM(480a, 576a)/480a=6 \text{ in the NTSC method}$$

and $$M1=LCM(480a, 576a)/576a=5 \text{ in the PAL method}$$

That is, the amount of data (video) for six frames in the NTSC method is equal to the that for five frames in the PAL method. In these equations, LCMs (x, y) are functions for determining least common multiples between x and y.

More concretely, in the recording and reproduction apparatus mentioned later, the video data is recorded by a pair head units 109 and 110, each pair head unit is displaced with the angle of 180 degrees on a rotary cylinder (not shown) and is rotated at a rotational speed of 1800 rpm (=30 rps). Then, fourth tracks are formed per rotation of the two pair head units 109 and 110, so that the number of tracks T of one recording and editing unit in the NTSC method is given by:

$$T=6[\text{Frame/Edit unit}]\times 4[\text{track/round}]\times 30[\text{round/sec}]/30[\text{Frame/sec}]=24[\text{track/Edit unit}]$$

The number of tracks T of one recording and editing unit in the PAL method is given by:

$$T=5[\text{Frame/Edit unit}]\times 4[\text{track/round}]\times 30[\text{round/sec}]/25[\text{Frame/sec}]=24[\text{track/Edit unit}]$$

That is, in both methods, the numbers of tracks T of one recording and editing unit are 24.

Therefore, the track structure of the NTSC method can be made the same as that of the PAL method. That is, as shown in FIG. 1, in both NTSC and PAL methods, the video signal is recorded or edited every cycle of twenty-four tracks (T=24). In other words, in the NTSC method, the video signal is recorded or edited every six frames and in the PAL method, the video signal is recorded or edited every five frames, so that the common track structure between the NTSC method and the PAL method having the cycle of twenty-four tracks.

As mentioned, the method of recording the video signal of this invention, in both NTSC method and the PAL method, the common track patterns (common track format) are recurrently formed on magnetic tape. Therefore, the video signal can be recorded or edited through the track unit processing by recording or editing the video signal every twenty-four tracks. Thus, this embodiment eliminates the necessity of editing gaps in a track, so that an efficiency in utilization of a track is improved and an amount of data which can be recorded per track increases. In this method, it is unnecessary to modify the video signal processing circuits but only change the number of frames (fields) of one recording unit. This point will be described later with reference to FIG. 2.

Then, recording the video signal and the sound signal will be described.

Generally, an amount of sound data is smaller than that of the video data and is not enough to form a track within a period of a frame. However, it is possible to form one track or more for a plurality of frames. That is, the video data of a plurality of frames is recorded on a plurality of tracks and the sound data of the same frames, that is, the sound data for a period corresponding to the plurality of frames of the video signal, is lumped and recorded on at least a track.

For example, as shown in FIG. 1, two tracks (P=2) out of the twenty-four tracks (a track cycle T=24) are assigned to the sound signal and the remaining twenty-two tracks are assigned to the video signal. In both the NTSC method and the PAL method, the amounts of data of the sound signals for one twenty-four track cycle (six frame periods in the NTSC method and five frame periods in the PAL method) are equal each other because time intervals of the twenty-four track cycle are the same ($\frac{1}{30}\times 6=\frac{1}{25}\times 5=\frac{1}{5}$[sec]).

Therefore, the track structure of the NTSC method is made equivalent to that of the PAL method. Moreover, the video data is recorded at a first area of the twenty-four tracks T and the sound data is recorded at a second area of the twenty-four tracks T and there is no track where both the video and sound data are recorded. Therefore both the video data and sound data are recorded or edited every track unit. That is, the recording the video data and the sound data can be controlled track by track. Then, the necessity of providing editing gap is eliminated, so that the efficiency of utilization of a track is improved. Moreover, it is not necessary to rewrite every track on the editing operation of the sound data and editing sound data for one editing unit can be rewritten by one scanning of two pair heads. Therefore, the possibilities that an unerased portion occurs in erasing and editing operations and an excessively erased portion on a track occurs are reduced. Moreover, the controlling of rewriting tracks is made easy. Moreover, the sound data is recorded on slant tracks, so that the burst error which may be caused by a scratch along the tape travelling direction can be reduced.

The data recording and reproduction apparatus according to this invention will be described.

The data recording and reproduction apparatus effects a recording operation with the structure as shown in FIG. 2A and a reproduction operation with the structure as shown in FIG. 2B.

One of a plurality of kinds of video signals, such as the NTSC method and the PAL method, wherein amounts of data per frame (field) are different is selected and supplied to the video memory 100 as the video data V. Two channels of sound data A0 and A1 accompanied with the video data V are supplied to sound data memories 101 and 102 respectively. A coding method of these video and sound signal data is not limited and both compressed video and sound data and non-compressed video and sound data can be used.

The video memory 100 stores the video data and error correction data of a predetermined number of frames (fields) more than the recording and editing unit. The sound data memories 101 and 102 store two channels of sound data and error correction data for the predetermined number of frames of the video data. In this data recording and reproducing apparatus, only two channels of sound data is recorded. However, four channel sound data can be also recorded by providing more sound memories. The data memories 100, 101 and 102 have plurality of sectors having a fixed capacity and the method of error correction are the same irrespective of the content of data.

A switching circuit 103 reads video data V from the memory 100 and sound data A0 and A1 from the memories 101 and 102 and forms the track format as shown in FIG. 1 and supplies it to the recording signal processing circuits 105 and 106. That is, the switching circuit 103 switchably outputs the video data and two channels of sound data to form the track format shown in FIG. 1, wherein the recording of the video data and the sound data are recorded every track unit or a sector unit which is mentioned later. A control circuit 104 responsive to a mode signal 120 controls the switching circuit 103 and memories 100 to 102 to change the number of frames (fields) of one recording and editing unit in accordance with the video and sound signals of the NTSC method or the PAL method. The mode signal may be inputted by a manual operation as the mode signal 120 or by detecting a code indicative of the video signal method attached to the video data to producing the mode signal 120.

The video memory 100 stores the video data of the predetermined number of frames in accordance with the mode signal 120 and at the same time, the sound data for the corresponding frame periods are stored in the sound memories 101 and 102. As mentioned, for example, in the NTSC method, the video and sound data of six frames are stored and in the PAL method, the video and sound data of five frames are stored. Then, the switching circuit 103 reads the video data and sound data in the video memory 100 and the sound data memories 101 and 102 and supplies the video data and the sound data toward the heads A and heads B of the pair head units 109 and 110 to form the track format as shown in FIG. 1. The read video and sound data is processed by the recording signal processing circuits 105 and 106, recording amplifiers 107 and 108 and recorded by the pair head units 109 and 110 on a magnetic tape 1.

The recording signal processing circuits 105 and 106 add identification code ID and synchronizing data SYNC to the video data and sound data and modulates them. Because there are two pair head units 109 and 110 with an angle offset of 180°, the video signal or the sound signal inputted the recording signal processing circuit 105 are supplied to the head A of the pair head 109 and the head A of pair head 110 and similarly, the video signal or the sound signal inputted the recording signal processing circuit 106 are supplied to the head B of the pair head 109 and the head B of the pair head 110. Therefore, two tracks of the video data or the sound data are recorded on the magnetic tape 1 at the same time. The recording amplifiers 107 and 108 supplies the recording signal to the magnetic heads through a rotary transformer (not shown) to record the video and sound data on the magnetic tape 1.

The pair head units 109 and 110 are mounted on a rotary cylinder (not shown). The head A of the pair head 109 has −azimuth and the head B of the pair head 109 has +azimuth and at corresponding positions apart from the heads A and B of the pair head 110 by the angle of 180° respectively. The heads A of respective pair head units have the same azimuth, that is −azimuth and the heads B of respective pair head units have the same azimuth, that is, +azimuth. Therefore, the pair heads 109 and 110 form the well-known helical scanning azimuth tracks. Accordingly, the pair head units 109 and 110 records the recording signal from the recording amplifiers 107 and 108 at the rotational speed of 1800 rpm (=30 rps), so that four tracks are formed per rotation of the rotary heads.

The reproduction side will be described.

In FIG. 2B, the reproduction signals from the A heads and from the B heads of pair head units 109 and 110 are amplified by the reproduction amplifiers 111 and 112 respectively. Outputs of the reproduction amplifiers 111 and 112 are supplied to reproduction signal processing circuits 113 and 114 including wave-shape equalizing circuits, PLL circuits for reproducing clock signals from the reproduced signals, detection circuit for detecting the synchronizing signals SYNC and identification data ID, and demodulation circuits for demodulation. As shown in FIG. 2B, there are two signal passages from the heads A and heads B of the pair head units 109 and 110 including the reproduction amplifiers 111 and 112 and reproduction signal processing circuits 113 and 114, so that the reproduced signals from two tracks can be reproduced at the same time.

A switching circuit 103' receives outputs of the reproduction processing circuits 113 and 114 and effects an inverse switching operation of the switching operation of switching circuit 103 to supply the sound data to the sound memories 101 and 102 and the video data to the video memory 100 at suitable timing at suitable addresses to reproduce the video data V' and sound data A0' and A1' in accordance with the mode signal 120. Then, the video memory 100 and the sound memories 101 and 102 are read continuously to reproduce the video signal V' and the sound signals A0' and A1' in accordance with the respective methods such as, the NTSC and PAL methods.

In the above-mentioned recording reproduction apparatus, the video data and the sound data are recorded on the magnetic tape 1 at a cycle of a plurality of frames and at a cycle of a unit of track as shown in the track format shown in FIG. 1. Therefore, on editing of the video data or the sound data, the recording operation is effected at the cycle of a unit of track. Therefore, there is no necessity to control the start or stop the recording on an intermediate point on a track. That is, the recording controlling on editing is similar to the normal recording and reproducing operations.

A second embodiment will be described.

In the first embodiment, because the amount of data (video) for six frame periods in the NTSC method is the same as that for five frame periods in the PAL method, a cycle of twenty-four tracks is determined as the recording and editing unit using the least common multiples between these frames. However, common multiples can be used for determining the number of tracks in the recording and editing unit.

That is, assuming that the recording and editing unit of the video data and the sound data is 6n frames (fields) in the NTSC method and 5n frames (fields) in the PAL method, the number of tracks in the recording and editing unit is determined as 24n, wherein n is a natural number. Therefore, the track structures of the NTSC and PAL method are made common by recording the video signal and sound signal every cycle of 24 tracks.

Particularly, in the case of the high resolution screen where the amount of the sound data is extremely smaller than that of the video data, the value n is suitably set such that the sound data is recorded to form at least a track within one recording and editing unit and video data recorded on the remaining tracks during the recording and editing unit.

Then, the sound data for more frame periods can be recorded at a cycle of a unit of a track. However, it is desirable that the value n is as small as possible to make the recording and editing unit small.

A third embodiment will be described.

In the first and second embodiments, the video data and sound data of the NTSC and PAL methods are recorded. However, this invention is not limited to both methods. That is, generally, this invention is applicable to the case that a plurality of kinds of video data and sound data having different amounts of data per frame or field is selected and recorded on tracks on a magnetic tape by helical scanning heads. Then, a general case will be described.

It is assumed that the recording and editing unit is M frames (fields) of video data and a plurality of channels of sound data for the period of these M frames (fields).

Then, the recording and editing unit, M frames (fields), are determined as follows:

For convenient, it is assumed that two kinds of video signals having the same sampling frequency and having a different amounts of video data per frame (field) are recorded. Moreover, it is assumed that an amount of first type of video data is X1 and an amount of second type of video data is X2, wherein X1 and X2 are positive real numbers.

It is assumed that recording and editing units are M1 and M2 (natural numbers) and XL is a real number.

$$M1=XL/X1$$

$$M2=XL/X2$$

wherein XL (least common multiple of a real number) providing a combination of M1 and M2 including minimum natural numbers is determined.

In this case, it is not always necessary that the XL is not a least common multiple but a given common multiple. Moreover, the number of types of video signals are more than two.

Generalizing this, the recording and editing unit Mk of kth video signal is given by:

$$Mk=n \cdot LCM(X1, X2, \ldots, Xk, \ldots)/Xk$$

where n is a natural number, LCM( , , . . . , , . . . ) is a function for determining a least common multiple (real number) between elements (positive real numbers) in the bracket, and Xk is an amount of data per frame (field) of kth type video signal.

Then, the amounts of data per Mk frames (field) are common among all types of video signals, namely, n·(X1, X2, . . . , Xk, . . .). Moreover, the amounts of sound signals from the respective types of video signals are common. Therefore, the number of tracks formed for an interval of Mk frames (field) are common.

Then, as similar to the case shown in FIG. 1, assuming that the number of tracks in the recording and editing unit is T, the sound data (a plurality of channels) for the Mk frames is recorded on P tracks and the video data is recorded on the remaining tracks (T−P). The natural number n is determined such that a plurality of channels of sound signal for the interval of Mk frames are stored in P tracks and the video data for the interval of Mk frames is stored in (T−P) tracks.

As mentioned above, according to the first to third embodiments, in the method of selectively recording one of a plurality of kinds of video signals having different amounts of video data per frame or field and a sound signal accompanied one of a plurality of kinds of video signals on a magnetic tape using a helical scanning head unit, one of a plurality of kinds of video signals and the sound signal are sectioned every Mk frames or fields. Mk is a natural number more than one and determined by a common multiple of the amount of the video data of one of the plurality of kinds of video signal per frame or field among the plurality of kinds of video signals. Then, the sectioned one of a plurality of kinds of video signal and the sound signal are recorded on the magnetic tape, wherein the track pattern recurrently formed is such that the video signal is collectively recorded at a first block of tracks and the sound signal is collectively recorded at a second block of tracks.

A fourth embodiment will be described.

In the first to third embodiments, the number of frames per recording and editing processing unit is determined to provide the common number of tracks where video data is recorded or edited in the plurality of different methods such as the NTSC method and the PAL method where the video signals have different amounts of data per frame. However, without determining the number of frames per recording and editing processing unit according to the conditions of first to third embodiments, it is also convenient for editing to record the video signal of a predetermined number of frames at a block of tracks and the sound signal of the same number of frames at a another block of tracks in order to record or edit the sound signal.

Figure 3A:
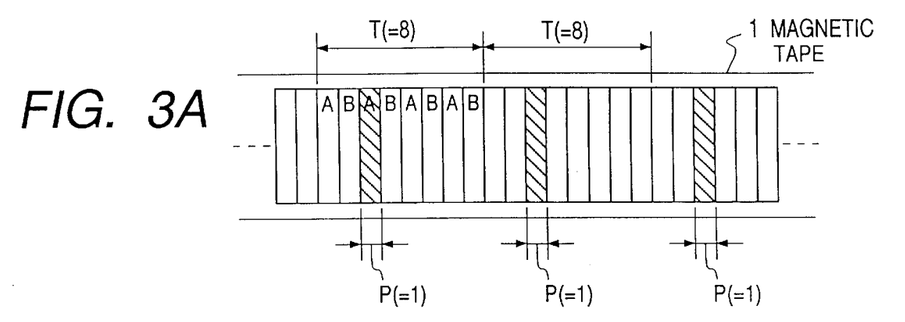
FIGS. 3A to 3C are illustrations of track formats of a fourth embodiment.
Figure 3B:
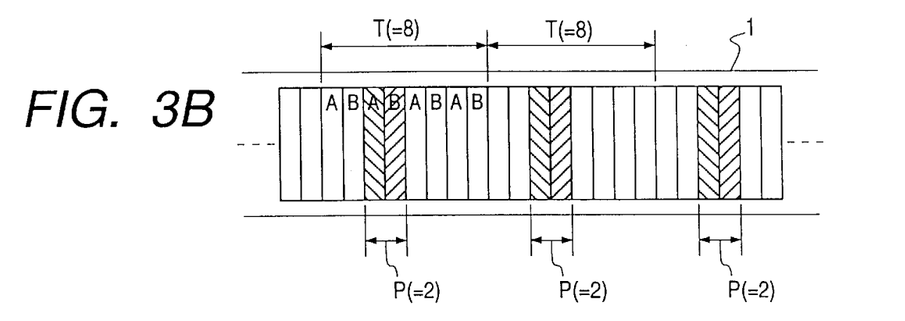
Figure 3C:
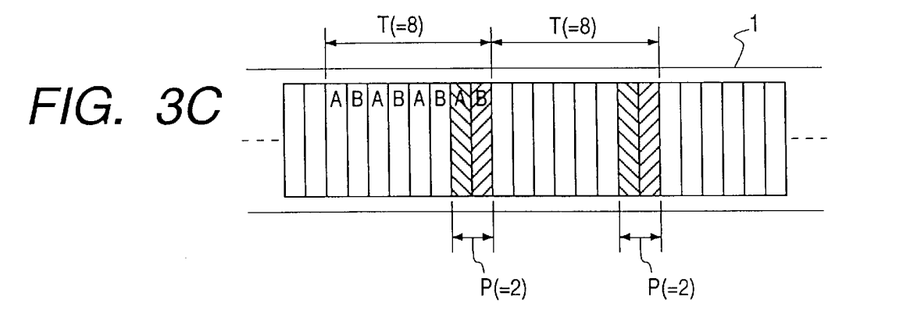

FIGS. 3A to 3C are illustrations of track formats of the fourth embodiment.

In this embodiment, m frames (fields) of the video data and the sound data are sectioned and recorded to have one recording and editing unit, wherein m is a natural number. That is, m frames of video data is sectioned and collectively recorded and the plurality of channels of sound data for the corresponding periods are also collectively recorded such that an amount of the plurality of channels of the sound data for the corresponding period corresponds an amount of data stored in one track.

The video and sound data of one recording and editing unit are recorded on respective special tracks out of consecutive T tracks (T is a natural number, for example, T=8 in FIGS. 3A to 3C). Assuming that the number of the tracks for the sound data is P (a natural number), the video data is recorded on (T−P) tracks for the video data. Therefore, the sound data can be edited in the track unit processing manner, that is, the recording video data and sound data of the same frames are switched with the change of tracks which is caused by the helical scanning on the magnetic tape.

The number of sound tracks in one recording and editing unit may be one (P=1) or two (P=2) or more.

The sound tracks may be arranged between tracks of video data in one recording and editing unit as shown in FIGS. 3A and 3B. However, the tracks of the sound data can be arranged at the end or top of one recording and editing unit as shown in FIG. 3C. When the tracks of the sound data stored at the end or the top of one recording and editing unit, the editing control of the video data is made easy because an area of the stored video data is not divided by an area of the stored sound data. Moreover, non-erased portions and excessively erased portion when only the video signal is edited are reduced.

A fifth embodiment will be described.

Figure 4:
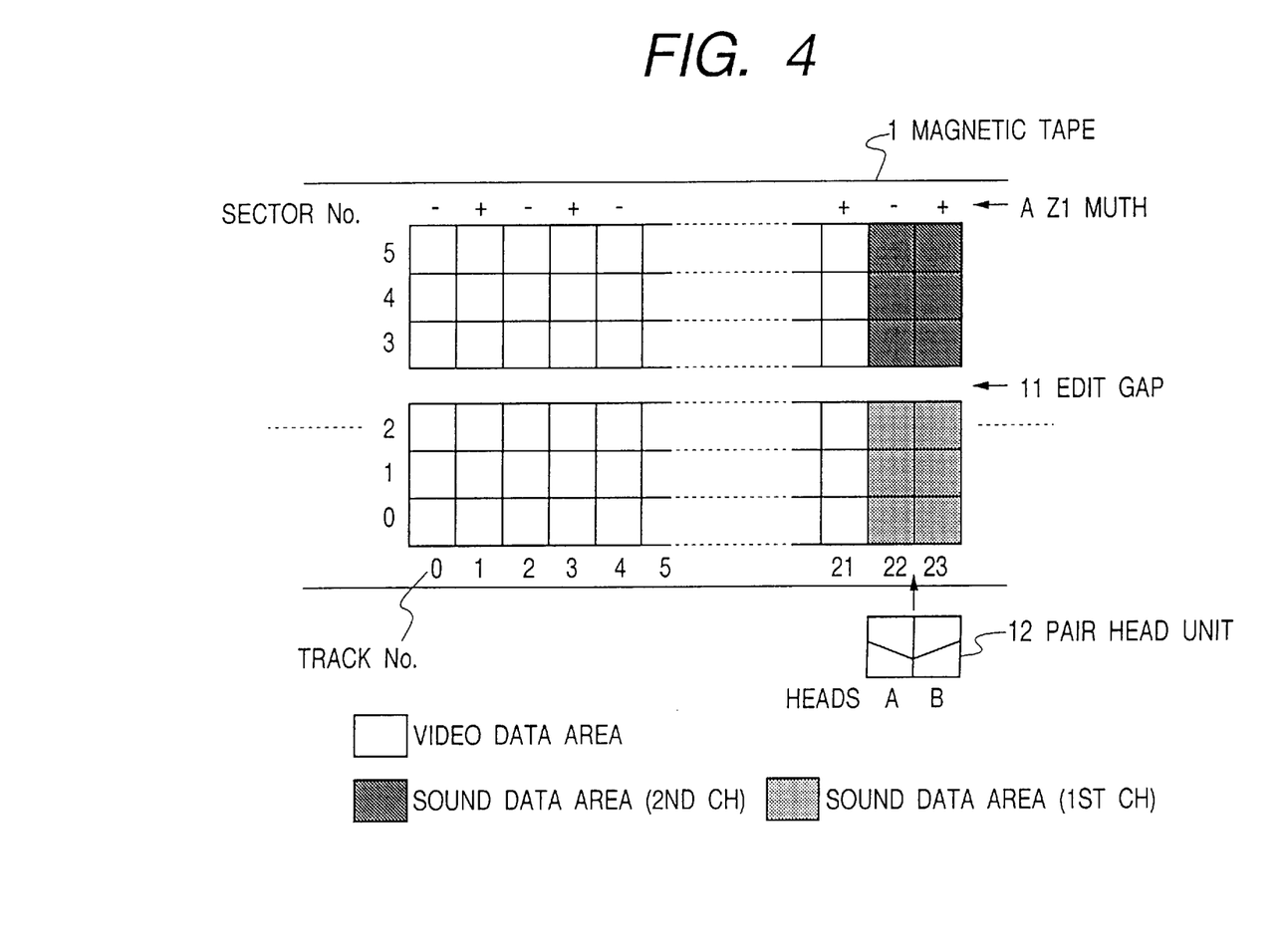
FIG. 4 is an illustration of a track format of a fifth embodiment.

FIG. 4 is an illustration of track formats of the fifth embodiment.

In this embodiment, on recording, the switching circuit 103 reads the video and sound data and supplies them to the heads A and heads B such that the video data and the sound data are recorded every track unit and sector unit.

That is in this embodiment, each of tracks are divided into six sectors (0 to 5) and there is provided an edit gap between the sectors Numbers. 0, 1, and 2 and Numbers. 3, 4, and 5.

In FIG. 4, the two channels of the sound data are stored on two consecutive tracks and these channels are divided by the edit gap 11. That is, the video data is recorded on 0 to 21th tracks and the first channel of the sound data is recorded on the sectors of Numbers. 0, 1, and 2 of the 22th and 23th tracks and the second channel of the sound data is recorded on the sectors of Numbers 3, 4, and 5 of the 22th and 23th tracks.

The two channels of the sound data are recorded with the edit gaps, so that with the pair head units 109 and 110, both channels or either channel of sound data can be independently edited by one scanning of tracks, so that the editing control is made easy.

Generally speaking, in the data recording unit having 2m combination heads and forming 2n sound tracks (n is a natural number), if channels of the sound data is arranged track by track, an isolation between its recording system and reproduction system is required for recording or reproduction at the same time. However, according to this embodiment, the channels of the sound data are provided every pair of tracks formed by combination heads at the same time, so that recording and reproduction can be switched substantially at the same time channel by channel by time division recording and reproducing manner.

A modification of the fifth embodiment will be described.

In the fifth embodiment, a channel of sound data is divided into even numberth data and odd numberth data with respect to sampling of the sound data and the even numberth of data and the odd numberth data are recorded on respective pair tracks. Though sound data on one of the pair tracks cannot be reproduced because of dust accumulated on the head or the like, the sound data can be reproduced with interpolation using the odd numberth sampled data. Therefore, elimination of the reproduced sound can be prevented with an acceptable quality of the reproduced sound.

For example, a data train of even numberth sound data are recorded on the track having the minus azimuth and a data train of odd numberth sound data are recorded on the track having the plus azimuth. Then, if the head having the minus azimuth does not correctly reproduce the sound data because of dust accumulated on the head, an interpolation can be effected using the reproduced data trains of the odd numberth data. The detection of the incorrectly reproduction may be detected by correlation of the sound data or the like.

A sixth embodiment will be described.

Figure 5:
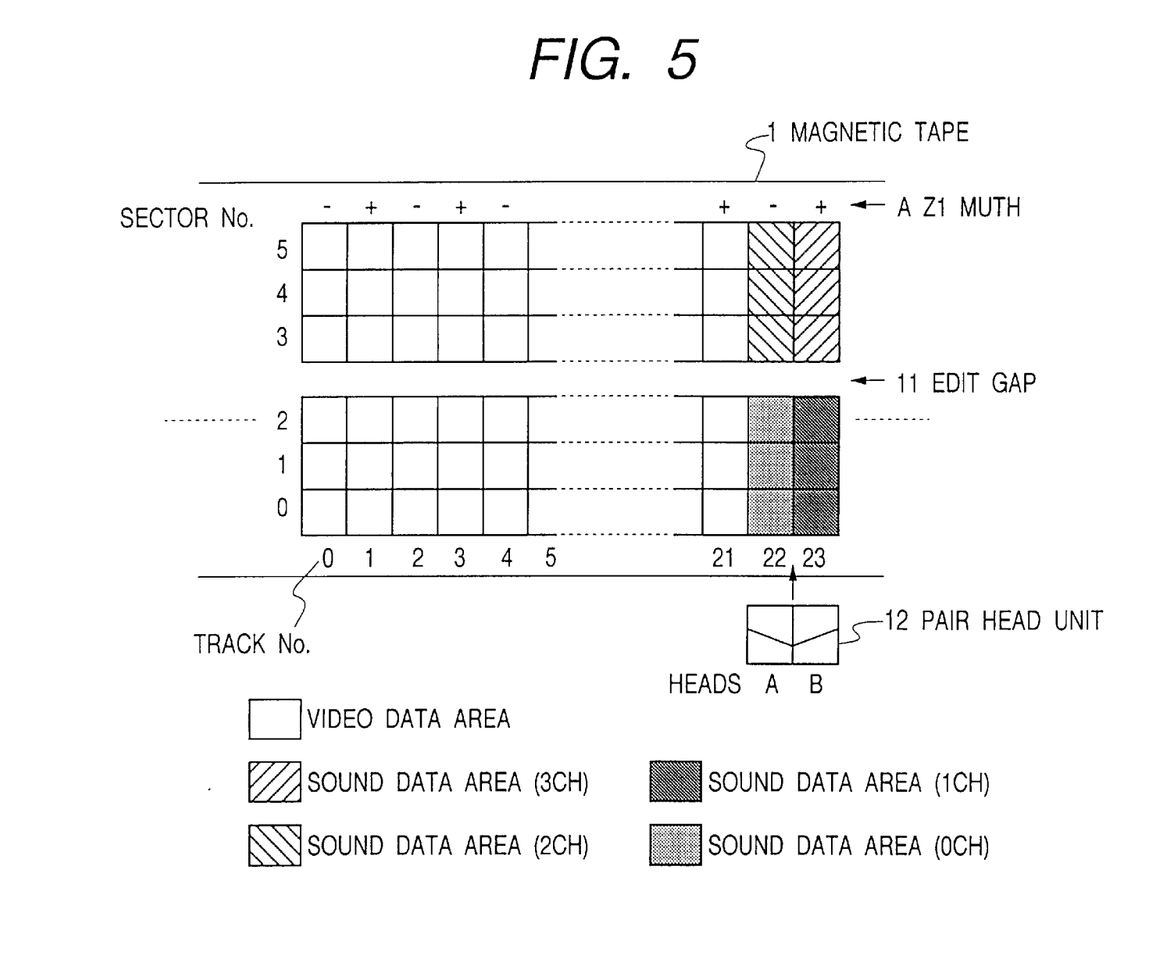
FIG. 5 is an illustration of track format of a sixth embodiment.

FIG. 5 is an illustration of track format of the sixth embodiment. In the fifth embodiment, two channels of sound data are recorded. In the sixth embodiment, four channels of sound data are recorded similarly. That is, a 0th channel of sound data is recorded on the sectors No. 0 to No. 2 of the 22th track, a first channel of sound data is recorded on the sectors No. 0 to No. 2 of the 23th track, a second channel of sound data is recorded on the sectors No. 3 to No. 5 of the 22th track, a third channel of sound data is recorded on the sectors No. 3 to No. 5 of the 23th track.

These channels of sound data has a lower sampling rate and a shorter bit length than than the fifth embodiment are arranged on tracks.

According to this structure, a multi-channel recording is provided except that the editing is effected between the editing gap. For example, the recording area for one channel of sound data sampled at 48 kHz with 16 bits provides two channels of sound data recording area wherein the sound data is sampled at 32 kHz with 12 bits. Therefore, the sound data is edited every two channels.

A seventh embodiment will be described.

Figure 6:
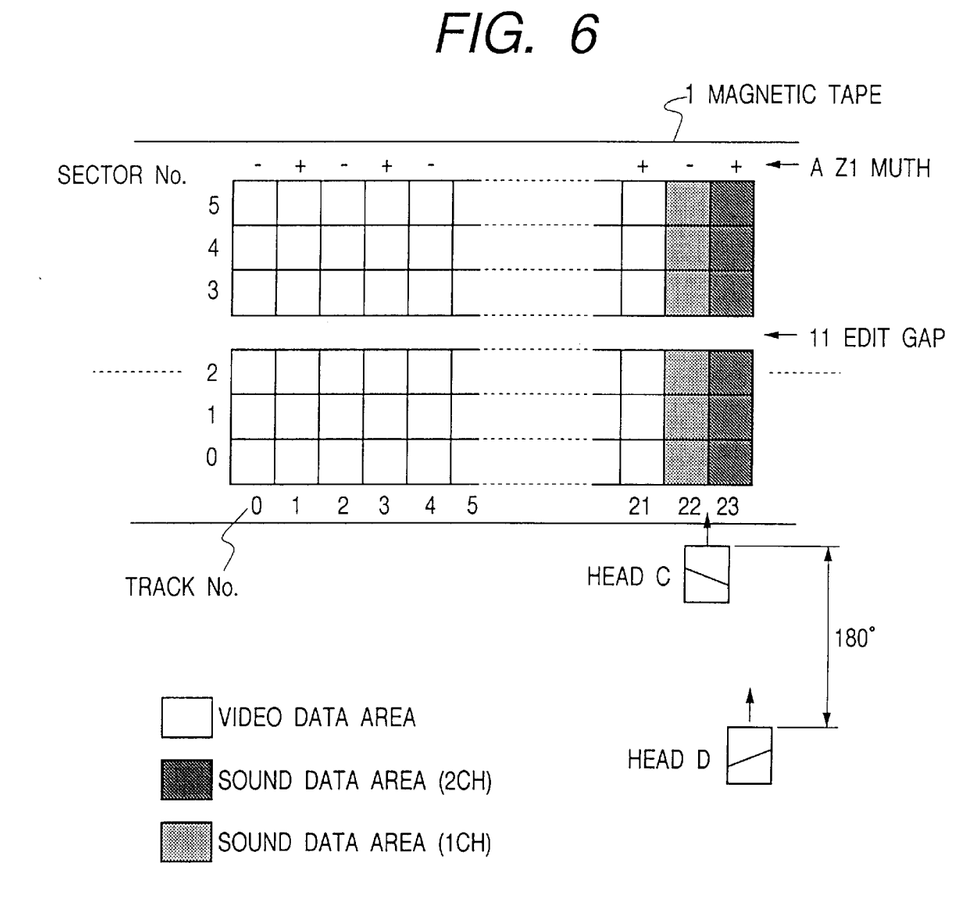
FIG. 6 is an illustration of a track format of the seventh embodiment.

FIG. 6 is an illustration of a track format of the seventh embodiment. A plurality of channels of sound data are continuously recorded every track. Therefore, each channel of sound data is arranged in the track scanning direction without the sound data extending to the adjacent track. Thus, each channel of the sound data can be independently edited.

Such a track arrangement of a plurality of channels of sound data eliminates the necessity of the editing gaps, so that an efficient of utilizing of tracks can be improved. Moreover, it is possible that with two single heads C and D arranged on a rotary cylinder (not shown) at 180° confronting positions, one channel of sound data is reproduced by the advancing single head and the retard single head records another channel of sound data.

In the above-mentioned embodiments, the recording control is effected every frame. However, the recording control may be effected every field. Moreover, in addition to the sound signal, other data can be also recorded similarly, and in place of the sound data, other data can be recorded.

What is claimed is:

1. A method of selectively recording a video signal of L different video signals respectively having first to L amounts of video data per frame or field and a sound signal accompanying said one video signal on a magnetic tape using a helical scanning head unit, L being a natural number greater than 1, the method comprising the steps of:

(a) sectioning said one video signal and said sound signal every Mk frames or fields, said Mk being a natural number greater than one and determined by dividing a common multiple of said first to L amounts of said video data of said video signals per frame or field by the amount of video data per frame or field of said one video signal; and (b) recording said sectioned video signal and said sound signal on said magnetic tape such that said Mk frames or fields are recorded on one unit of T tracks on said magnetic tape with a common track pattern being repeated along the magnetic tape, T being a natural number greater than one.

2. A method according to claim 1, wherein said L video signals include a first video signal according to the NTSC method and second video signal according to the PAL method, Mk is 6N when said first video signal is recorded, and Mk is 5N when said second video signal is recorded, N being a natural number.

3. A method according to claim 1, wherein said helical scanning head unit is rotated in a constant speed which is common among said L video signals.

4. A method according to claim 1, wherein said sectioned video signal is recorded on (T−P) tracks and sectioned sound signal is recorded on P tracks on said magnetic tape, T and P being natural numbers, wherein T>P≧1.

5. A method according to claim 1, wherein each of said L video signals is recorded with a common pattern of every T tracks and a common pattern of P tracks of the accompanying sound signals.

6. A method according to claim 1, wherein said sectioned video signal and said sound signal are repeatedly recorded on said magnetic tape in a first and a second block of tracks formed by said helical scanning head unit respectively.

7. A method according to claim 1, wherein said helical scanning head unit has a pair of heads for forming two consecutive tracks on said magnetic tape, said accompanying sound data has a plurality of channels of sound signals, and said plurality of channels of sound signal are recorded so as to be divided into two portions in the direction of said tracks with at least an editing gap therebetween.

8. A method according to claim 1, wherein said accompanying sound data has a plurality of channels of sound signals, and each of said plurality of channels of sound signal is recorded within the same track.

9. A method of recording video data and accompanying sound data on a magnetic tape using a helical scanning head unit, the method comprising the steps of:

(a) sectioning said video data and said accompanying sound data every S frames or fields, said S being a natural number greater than one and being determined such that an amount of said sound data for said S frames or fields is an integer multiple of an amount of data recorded on one track formed by said helical scanning on said magnetic tape; and (b) recording the sectioned sound data on p tracks and recording the sectioned video data on (T–P) tracks on said magnetic tape such that one unit of T tracks is repeatedly recorded on said magnetic tape, T and P being natural numbers and wherein $T > P \geq 1$.

10. A method according to claim 9, wherein each set of said (T–P) tracks of video data and each set of P tracks of sound data are respectively recorded in first and second blocks.

11. A method according to claim 9, wherein said helical scanning head unit has a pair of heads for forming two consecutive tracks on said magnetic tape, said accompanying sound data has a plurality of channels of sound signals, and said plurality of channels of sound signal are recorded so as to be divided into two portions in the direction of said tracks with at least an editing gap therebetween.

12. A method according to claim 9, wherein said accompanying sound data has a plurality of channels of sound signals, and each of said plurality of channels of sound signal is recorded within the same track.

* * * * *